(12) United States Patent
Fowler et al.

(10) Patent No.: US 12,472,698 B2
(45) Date of Patent: Nov. 18, 2025

(54) APPARATUS AND METHODS OF SEALING POUCHES

(71) Applicant: ARTHREX, INC., Naples, FL (US)

(72) Inventors: Ronald Fowler, Naples, FL (US); Stephen Seipel, Naples, FL (US); David Altomare, Ave Maria, FL (US); Teresa Oberbreckling, Alpharetta, GA (US)

(73) Assignee: ARTHREX, INC., Naples, FL (US)

( * ) Notice: Subject to any disclaimer, the term of this patent is extended or adjusted under 35 U.S.C. 154(b) by 204 days.

(21) Appl. No.: 17/938,052

(22) Filed: Oct. 5, 2022

(65) Prior Publication Data

US 2024/0116252 A1 Apr. 11, 2024

(51) Int. Cl.
*B29C 65/34* (2006.01)
*B29C 65/00* (2006.01)

(52) U.S. Cl.
CPC .... *B29C 65/3404* (2013.01); *B29C 66/43121* (2013.01); *B29C 66/912* (2013.01); *B29C 66/963* (2013.01)

(58) Field of Classification Search
CPC ............ B29C 66/43121; B29C 66/912; B29C 66/963; B29C 65/18; B29C 66/1122; B29C 66/849; B29C 66/91231; B29C 66/961; B29C 65/3404
See application file for complete search history.

(56) References Cited

U.S. PATENT DOCUMENTS

| | | | | |
|---|---|---|---|---|
| 5,277,745 A | * | 1/1994 | Williams | .......... B29C 66/91421 |
| | | | | 156/515 |
| 2014/0078711 A1 | * | 3/2014 | Bolanos | ................ B29C 66/542 |
| | | | | 156/350 |
| 2024/0000985 A1 | * | 1/2024 | Caldera | ................ B29C 66/857 |

FOREIGN PATENT DOCUMENTS

CN 103639621 A * 3/2014 .......... G05B 19/425

OTHER PUBLICATIONS

Unknown, "Precision Heatseal Equipment", Packworld USA, Whitepaper.

* cited by examiner

*Primary Examiner* — S. Behrooz Ghorishi
(74) *Attorney, Agent, or Firm* — Potomac Law Group, PLLC

(57) ABSTRACT

Assemblies, apparatus, and methods for heat sealing and monitoring are disclosed. A dual heat-sealing system includes a heat seal bar assembly with process monitor that allows to quickly change out heat bands and ensure that the effective length of the heat band matches the width of the seal (of the material being sealed), providing consistent and superior seal quality. A heat seal bar assembly includes multiple heat bars sized to easily match the size of the pouch being sealed. The heat bars are removable and replaceable. The heat bars are provided with at least one memory chip. The memory chip allows for storage and retrieval of information regarding the replaceable heat bar.

7 Claims, 23 Drawing Sheets

DETAIL A

212

DETAIL A

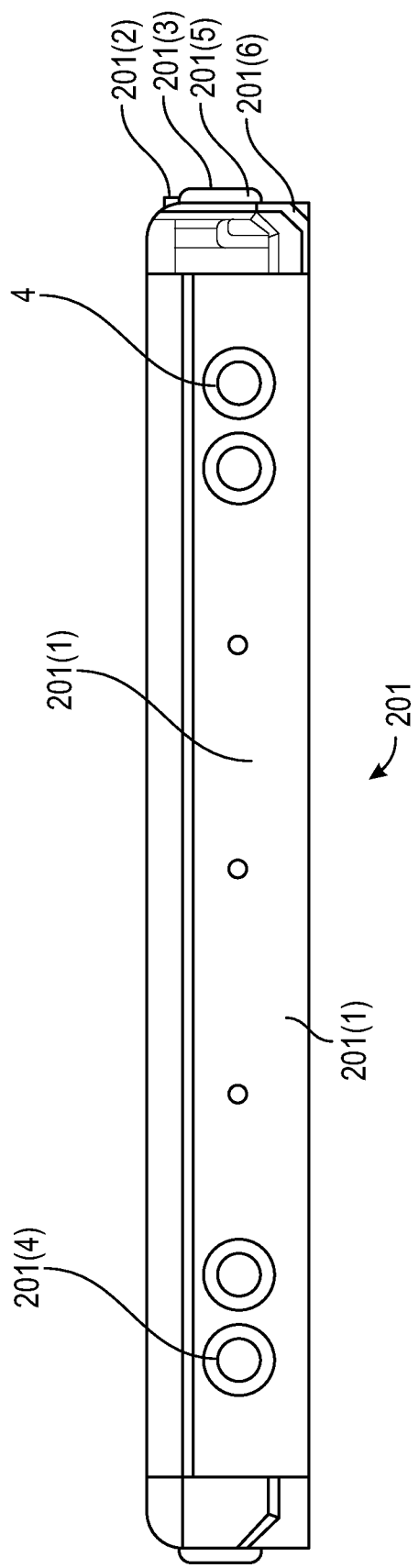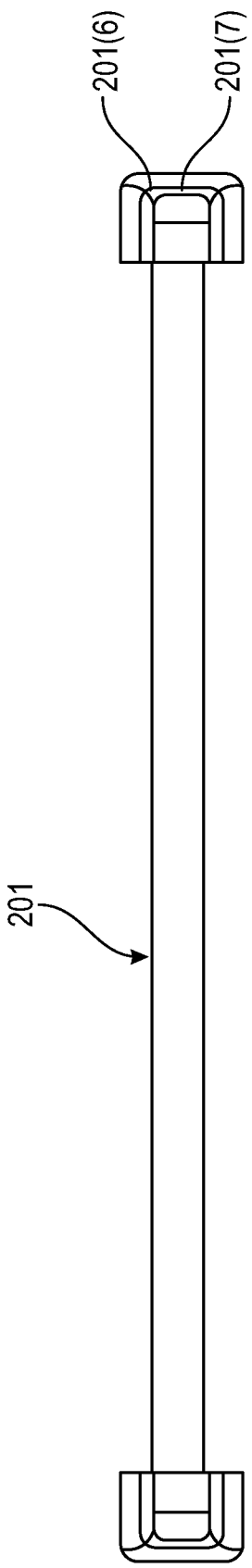

FIG. 35

APPARATUS AND METHODS OF SEALING POUCHES

BACKGROUND

The disclosure relates to systems, apparatus, and methods for heat sealing pouches.

SUMMARY

Systems, assemblies, apparatus, and methods for heat sealing are disclosed. A dual heat-sealing system includes a heat seal bar assembly with a process monitor that allows to quickly change out heat bands and ensure that the effective length of the heat band matches the width of the seal (of the material being sealed), providing consistent and superior seal quality. A heat seal bar assembly includes a plurality of heat bars adapted to easily match the size of the pouch being sealed. At least one of the plurality of heat bars is a replaceable bar provided with at least one memory chip. The at least one memory chip allows for storage and retrieval of information regarding the replaceable heat bar.

Methods of sealing bagged articles are also disclosed. In an embodiment, quick change variable effective width heat seal bars are provided with intelligent recognition for pouch sealers (such as impulse pouch sealers), eliminating detailed processing requirements, dedicated equipment to each product, and extensive modifications between product changes.

BRIEF DESCRIPTION OF THE DRAWINGS

FIG. 24 is a front view of the top bar assembly of FIG. 23.

FIG. 25 is a top view of the top bar assembly of FIG. 23.

Figure 35:
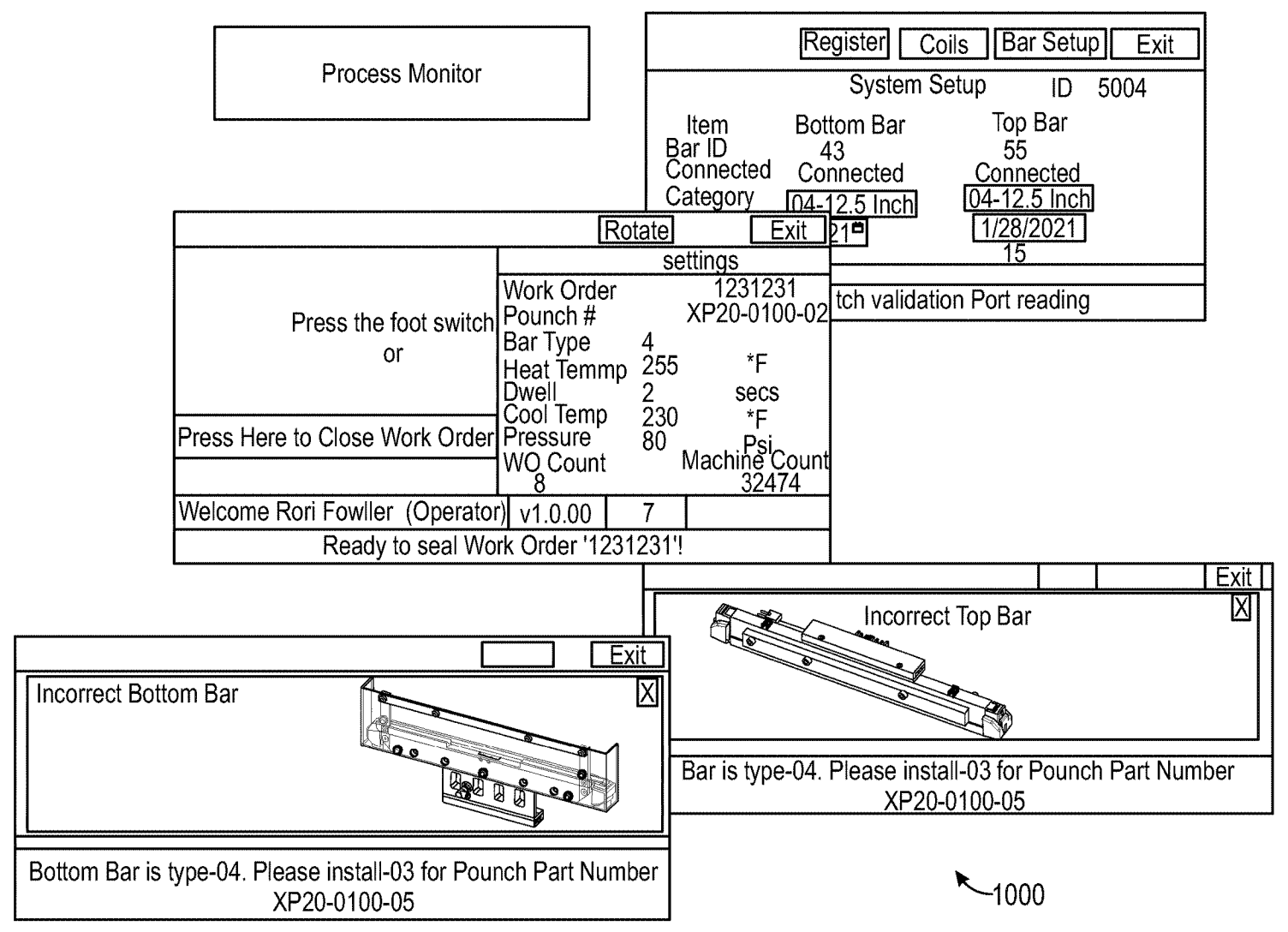

FIG. 35 illustrates various software components of the heat-sealing system of FIG. 33.

DETAILED DESCRIPTION

Figure 1:
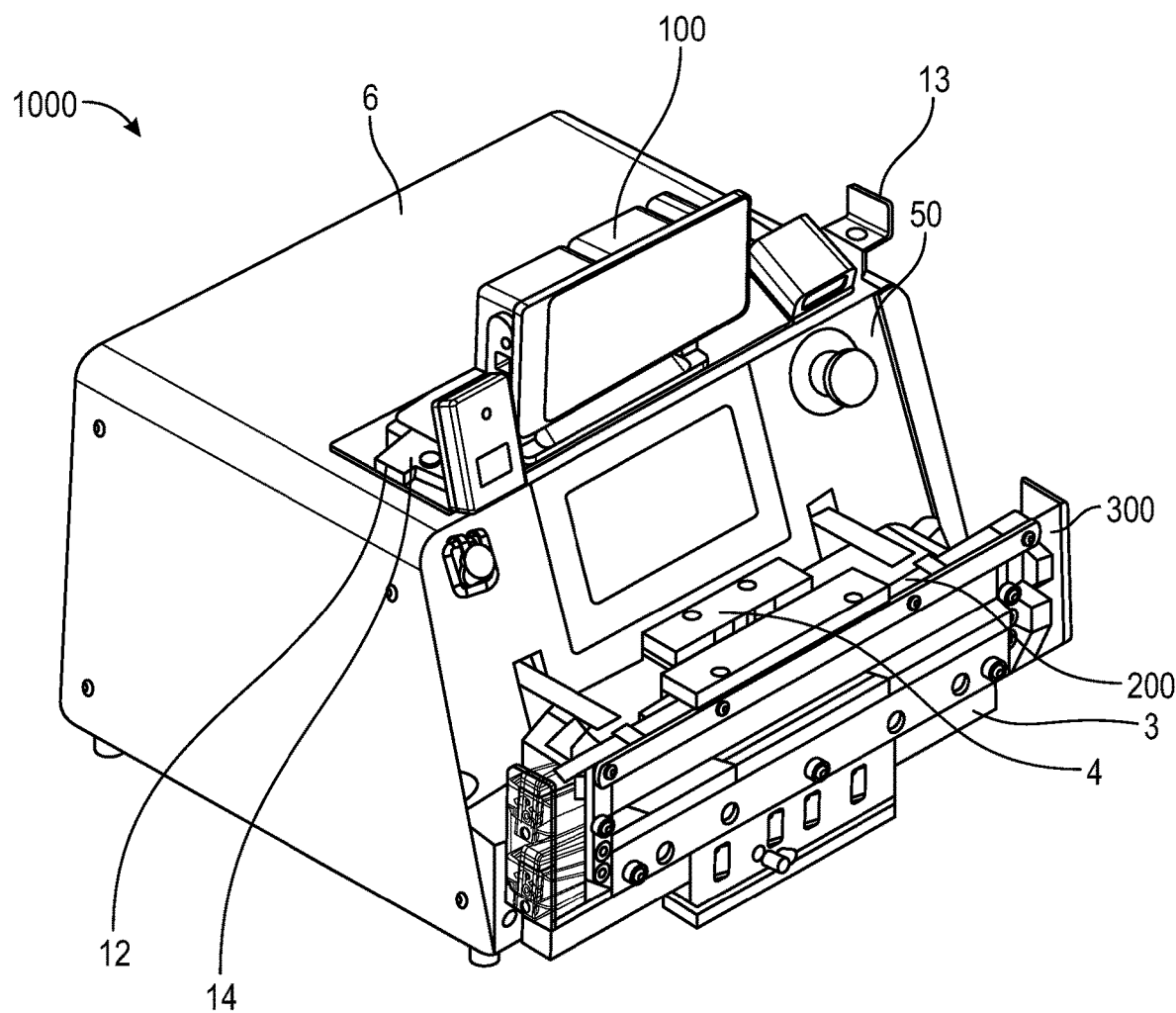
FIG. 1 is a perspective view of a heat-sealing system according to an embodiment.

The present disclosure provides apparatus, systems, and methods of heat sealing and monitoring. A plurality of heat bars can be used interchangeably to match and accommodate various pouch sizes. At least one of the plurality of heat bars has a length different from the length of the other heat bars. At least one of the plurality of heat bars has an effective heating area different from the effective heating areas of the other heat bars. At least one of the plurality of heat bars includes a memory device to allow bar identification and to store information regarding the at least one heat bar. A memory device can be a memory chip. A memory device can store information regarding identifying parameters of the at least one heat bar, for example, size, age and/or number of cycles experienced by the at least one heat bar. A plurality of heat bars can be used interchangeably to retrofit a heat-sealing apparatus.

In an embodiment, two of the plurality of heat bars are employed interchangeably to match and accommodate various sizes of pouches to be sealed. In an embodiment, each of the two heat bars includes a memory device to allow bar identification and to store information regarding each of the two heat bars. A memory device can be a memory chip. A memory device can store information regarding identifying parameters of each of the two heat bars, for example, size, age and/or number of cycles experienced by each of the two heat bars. In an embodiment, each of the two heat bars includes a mount to allow easy attachment to and detachment from a heat-sealing apparatus.

A heat-sealing assembly comprises a heat-sealing apparatus; a first heat bar and a second heat bar configured to be securely attached to and detached from the heat-sealing apparatus; and a processing unit. The first heat bar and the second heat bar can be selected from a plurality of heat bars based on identifying criteria of a pouch to be sealed. The identifying criteria can be one of length of the pouch, pouch number, work order, and user ID. The first heat bar and the second heat bar can be removably attached to and detached from the heat-sealing apparatus. The processing unit is configured to identify data and display the data on a display. The heat-sealing assembly is an integrated system in which the processing unit is configured for different applications such as, for example, communication with the sealer; reading/writing bar information on bar memory chip; calibration; and recording parameters of sealing history, among others.

Methods of heat sealing with a heat bar assembly including interchangeable and replaceable heat bars are also disclosed. A method of heat sealing a plurality of pouches includes inter alia: (i) identifying at least one parameter of at least one of the plurality of pouches to be sealed; (ii) selecting a first heat bar and a second heat bar based on the at least one parameter of the at least one of the plurality of pouches to be sealed; (iii) installing the first heat bar and the second heat bar onto a heat-sealing apparatus; and (iv) sealing the at least one of the plurality of pouches. The method can further include mounting the first heat bar with a first mount onto the heat-sealing apparatus; mounting the second heat bar with a second mount onto the heat-sealing apparatus; verifying calibration of the first and second heat bars; and monitoring the sealing process to ensure that a seal is created within validated range. The at least one parameter can be a size of the pouch. The at least one parameter can be an identification number of the pouch. The at least one parameter can be a label number.

Methods of monitoring a heat-sealing assembly with interchangeable and replaceable heat bars are also disclosed. A method of monitoring a heat-sealing apparatus includes inter alia: (i) selecting and installing onto the heat-sealing apparatus a first heat bar and a second heat bar based on an identifying parameter of a pouch to be sealed; (ii) recalibrating the heat-sealing apparatus; and (iii) monitoring the sealing process to ensure that a seal is created within a validated range. The method can further include mounting the first heat bar with a first mount onto the heat-sealing apparatus; mounting the second heat bar with a second mount onto the heat-sealing apparatus; and verifying calibration of the first and second heat bars. The method can further include preventing sealing of a pouch that has not been validated for sealing; and collecting process data during the sealing process. The at least one parameter can be a size of the pouch. The at least one parameter can be an identification number of the pouch. The at least one parameter can be a label number. The method can further include employing onboard identification circuitry to identify the pouch and display pouch information on a display prior to sealing, entering the information, and conducting the sealing.

Referring now to the drawings, where like elements are designated by like reference numerals, FIGS. 1-35 illustrate various structural components of heat-sealing system 1000 (assembly 1000; system 1000; heat seal bar assembly 1000; heat seal bar system 1000) of the present disclosure.

FIG. 1 illustrates a perspective view of heat-sealing system 1000 including heat-sealing apparatus 50 (heat sealer 50; sealer 50; heat-sealing device 50); monitoring system 100 (process monitor 100; processing unit 100; processing and display unit 100; software assembly); top bar assembly 200; bottom bar assembly 300; and sensor assembly 400. Heat-sealing system 1000 provides quick change of heat bars with monitoring by specific sensor and software.

Figure 2:
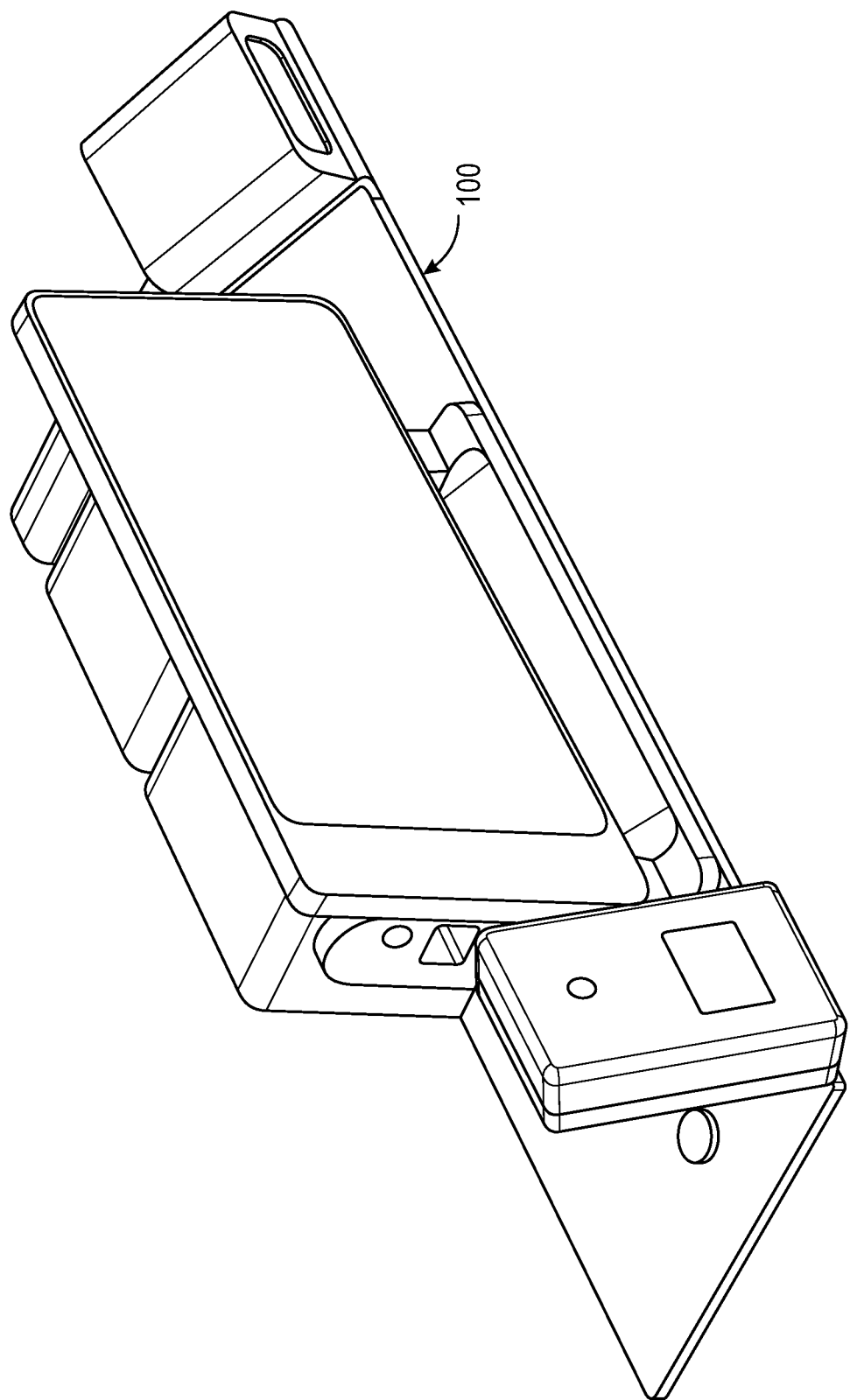
FIG. 2 is a perspective view of a monitoring system of the heat-sealing system of FIG. 1.
Figure 3:
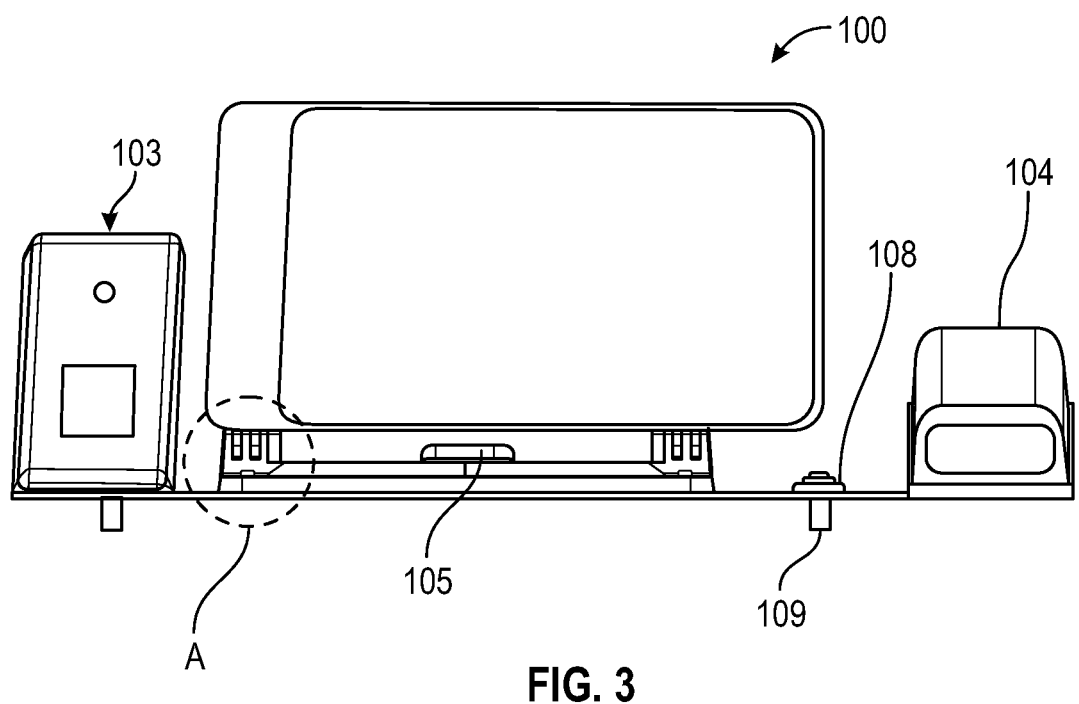
FIG. 3 is a front view of the monitoring system of FIG. 2.
Figure 4:
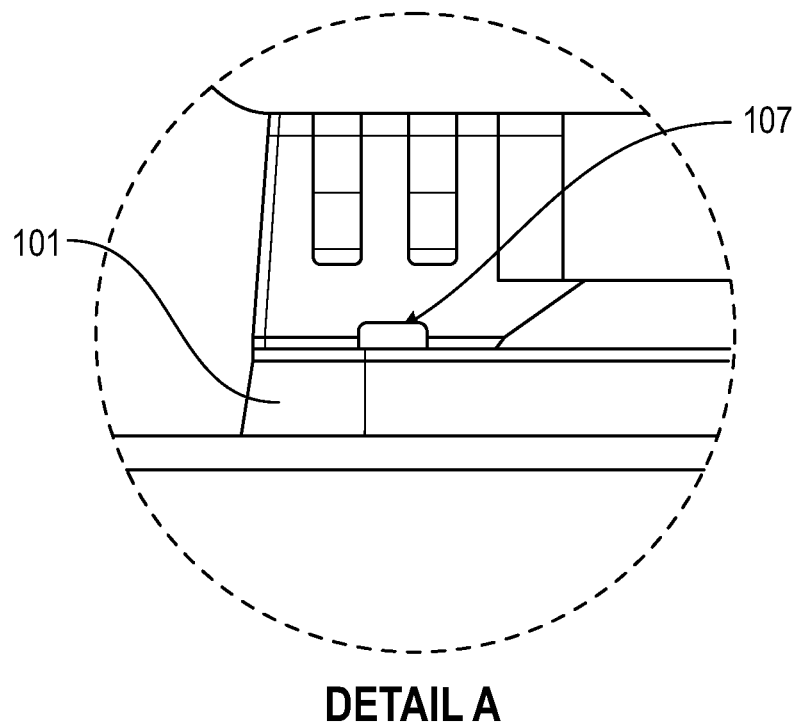
FIG. 4 illustrates enlarged detail A of FIG. 3.
Figure 5:
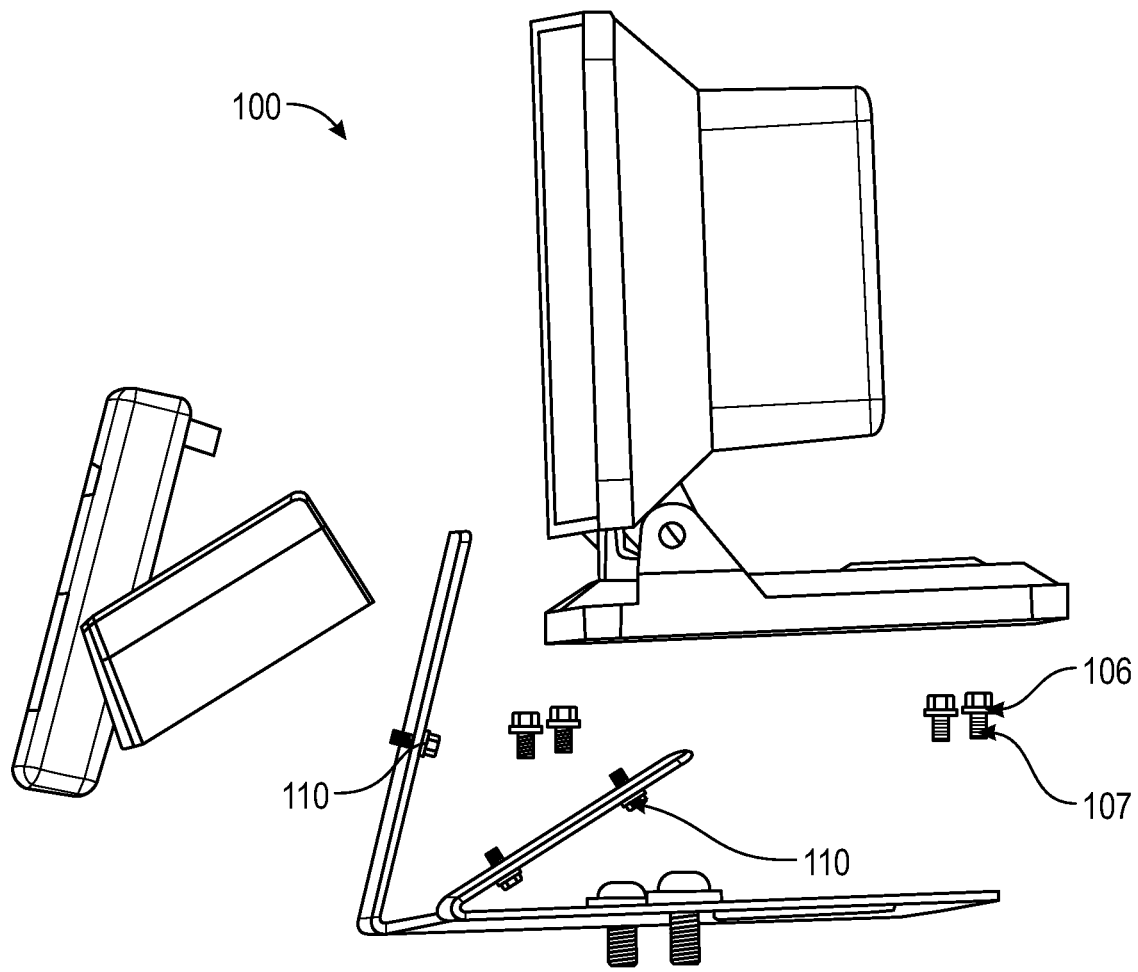
FIG. 5 is an exploded view of the monitoring system of FIG. 2.

Structural components of heat-sealing system 1000 are set forth below:
- 3—mount, lower bar assembly
- 4—mount, top bar assembly
- 5—grommet
- 6—cover assembly for heat-sealing apparatus 50 (Packworld)
- 12—thermocouple storage box
- 13—wrench holder
- 14—calibration fixture FIGS. 2-5 illustrate various structural components of monitoring system 100 of the present disclosure. FIG. 2 is a perspective view of the monitoring system 100. FIG. 3 is a front view of the monitoring system 100. FIG. 4 is an enlarged view of detail A of FIG. 3. FIG. 5 is an exploded view of the monitoring system 100.

Figure 6:
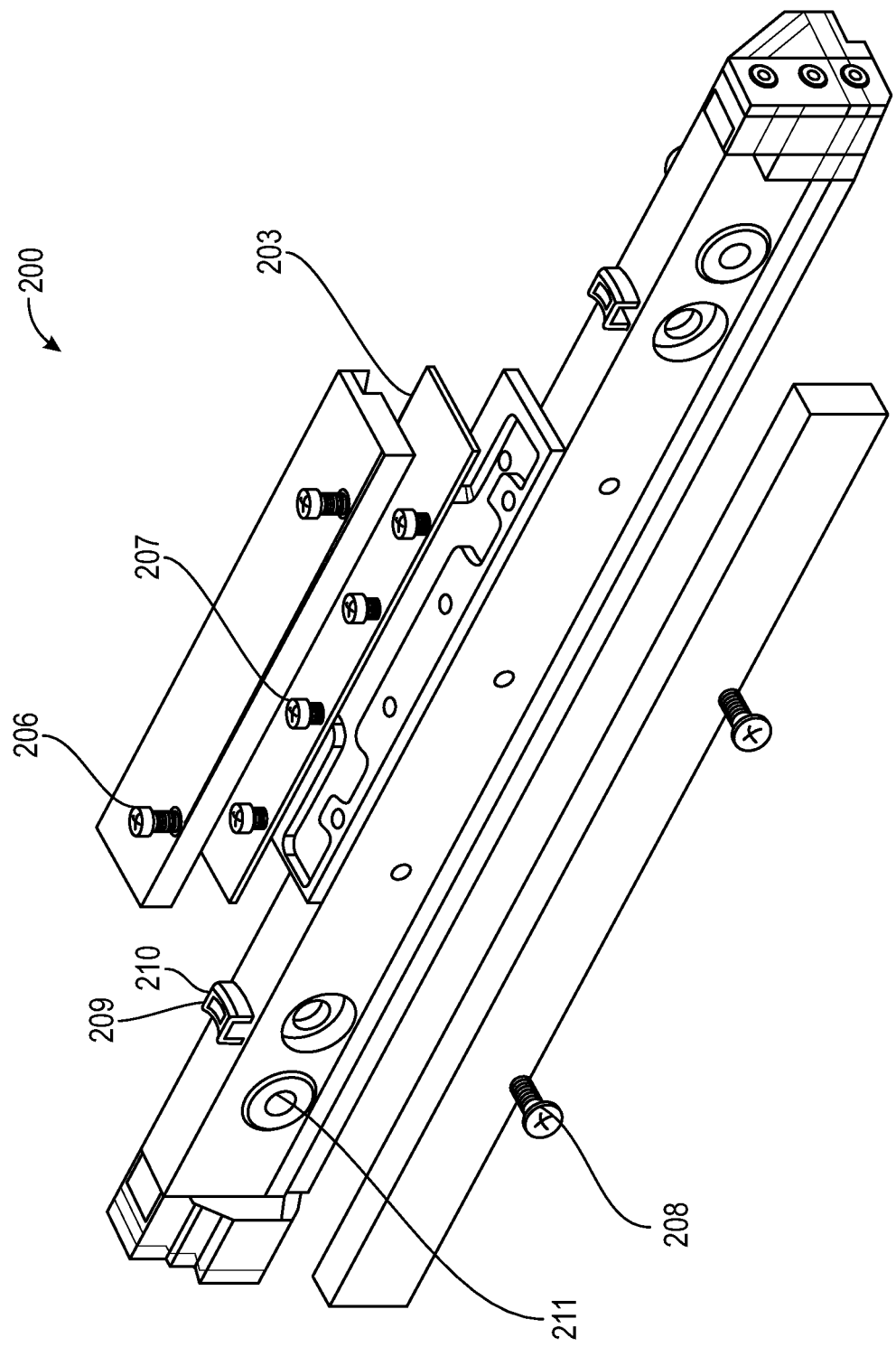
FIG. 6 is an exploded view of a top bar assembly of the heat-sealing system of FIG. 1.
Figure 7:
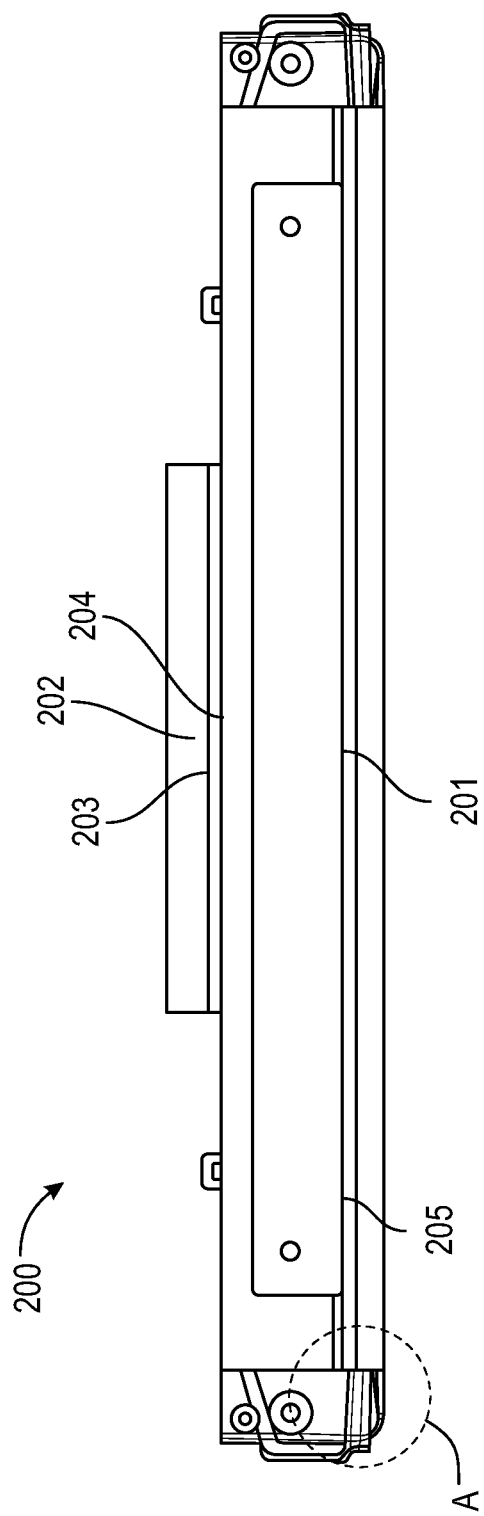
FIG. 7 is a front view of the top bar assembly of FIG. 6.
Figure 8:
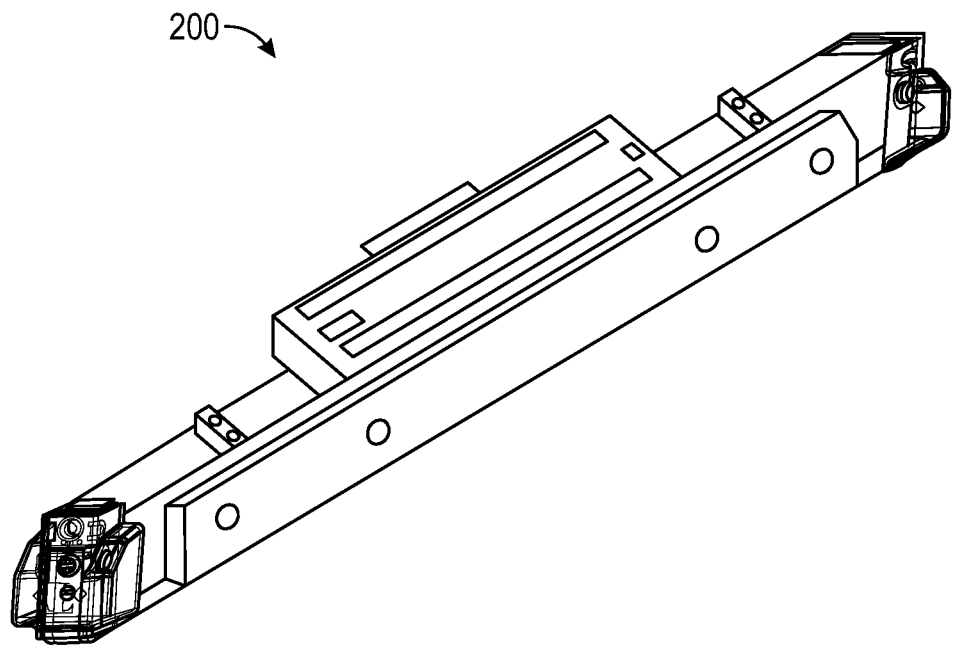
FIG. 8 is a perspective view of the top bar assembly of FIG. 6.
Figure 9:
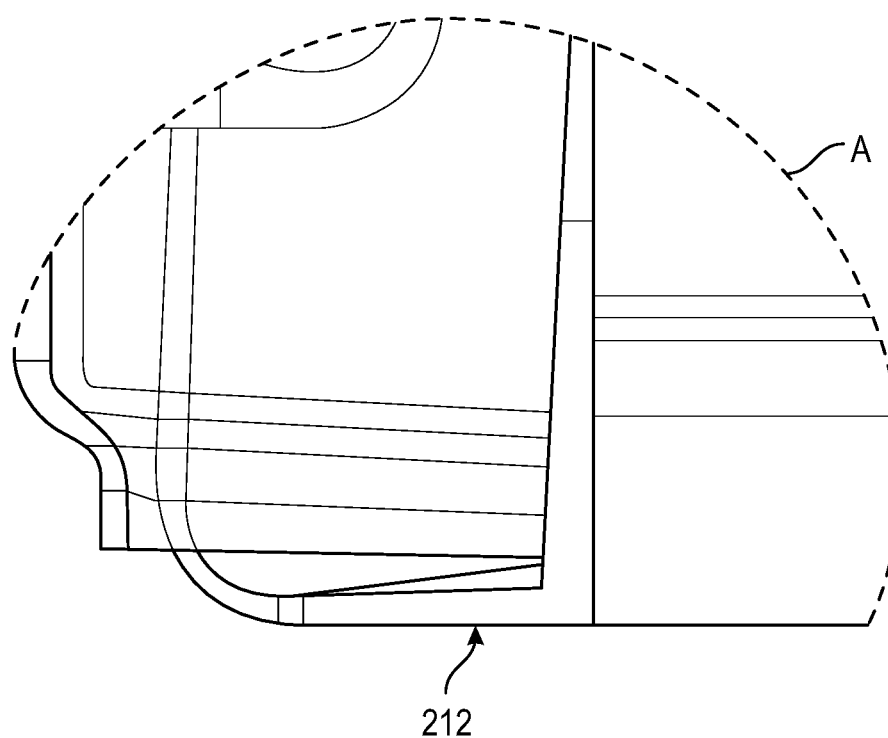
FIG. 9 illustrates enlarged detail A of FIG. 7.
Figure 10:
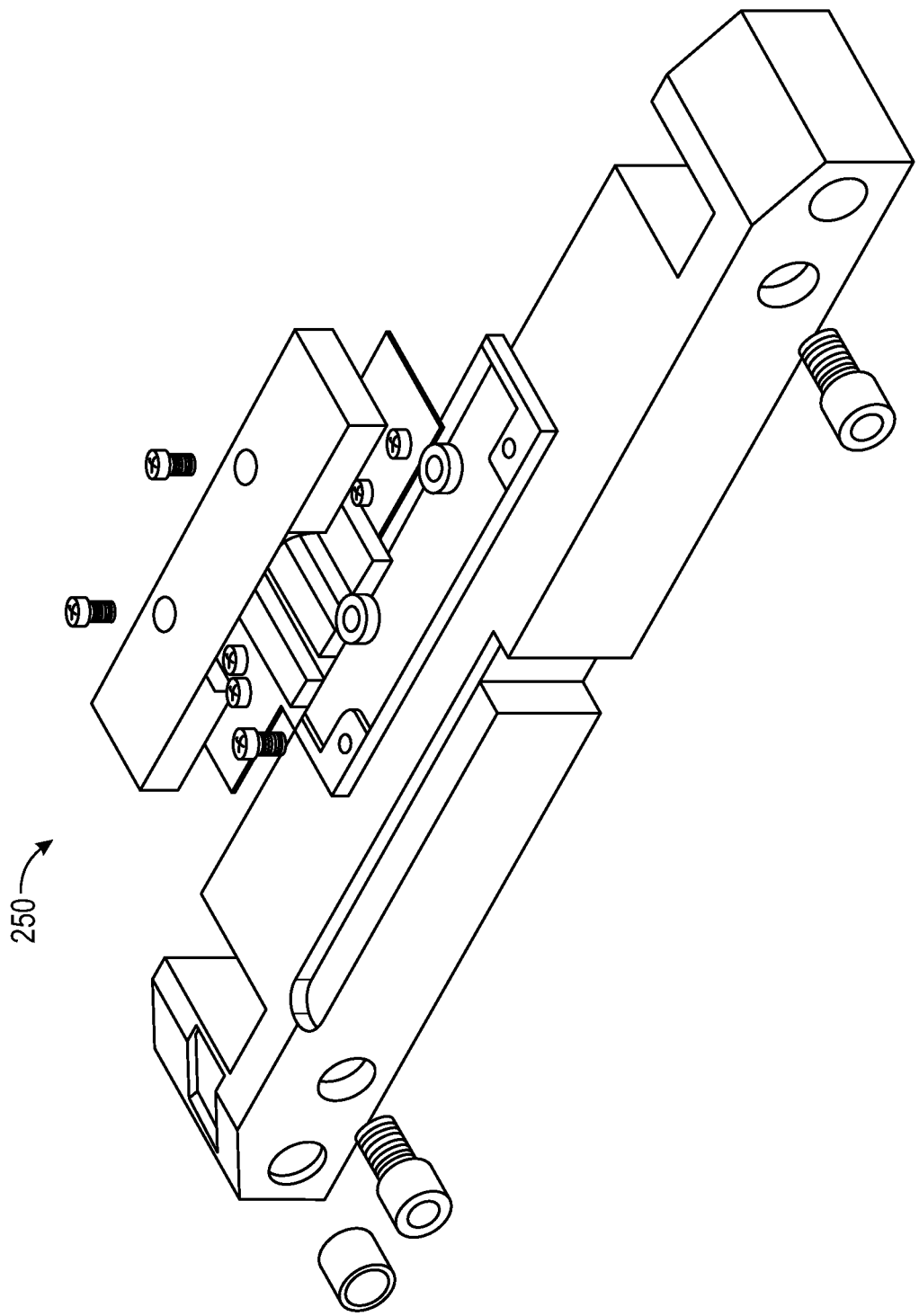
FIG. 10 is an exploded view of the mount for the top bar of the heat-sealing system of FIG. 1.
Figure 11:
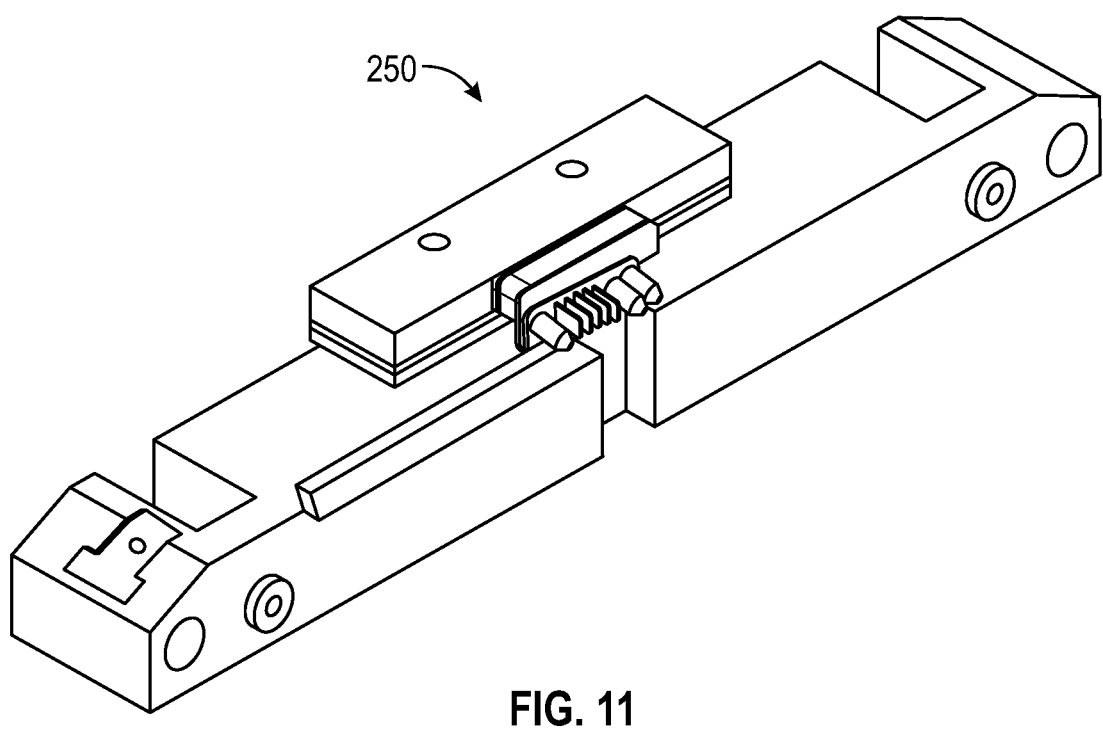
FIG. 11 is a perspective view of the mount of FIG. 10.
Figure 12:
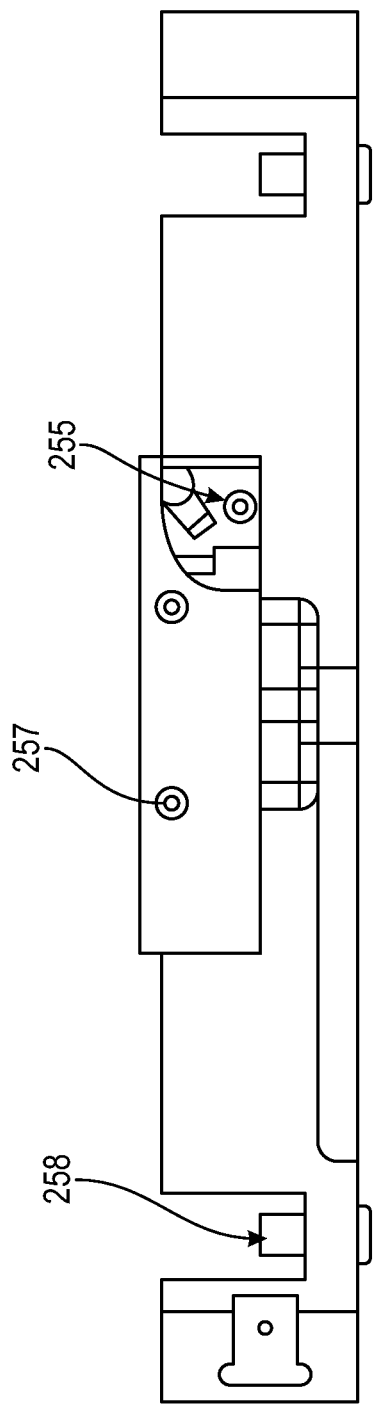
FIG. 12 is a back view of the mount of FIG. 11.
Figure 13:
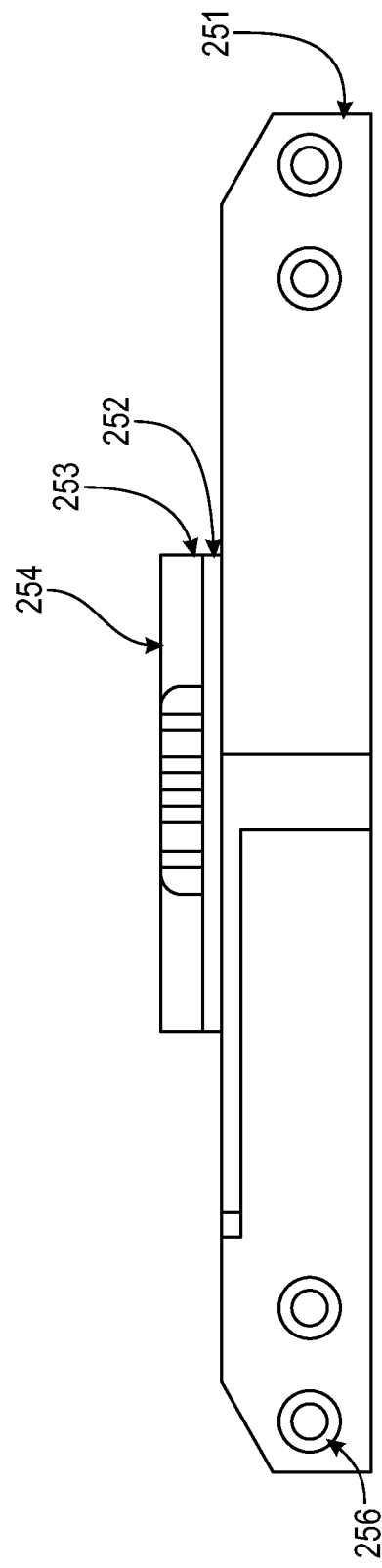
FIG. 13 is a front view of the mount of FIG. 11.

Structural components of monitoring system 100 are set forth below:
- 101—monitor screen with case
- 102—mount, monitoring system and scanners
- 103—badge reader
- 104—scanner
- 105—grommet
- 106—washer
- 107—screw
- 108—washer
- 109—pin
- 110—SHCS As detailed below, monitoring system 100 of FIGS. 2-5 provides the following actions:
- Reads ID, size and cycle count from the top and bottom bars
- Gathers input from user: User ID, Work Order, Pouch Number and Starting Label Number
- Forces the sealer to recalibrate if a new bar is installed
- Verifies whether the calibration is within acceptable limits
- Notifies and forces bars to be maintained based on age and/or cycle count
- Forces the use of a matching bar size based on Pouch Number
- Directly sets the sealing parameters of the sealer based on Pouch Number
- Monitors the sealing process to ensure the seal is created within the validated range
- Prevents sealing of pouches that have not been validated for the sealer
- Allows operators to record a seal failure based on visual inspection (wrinkled, burnt, weak, etc.)
- Collects actual process data during the sealing process Reference is now made to FIGS. 6-11 which illustrate various views and structural components of top bar assembly 200 and associated mount 250. FIG. 6 is an exploded view of a top bar assembly 200. FIG. 7 is a front view of the top bar assembly 200, while FIG. 8 is a perspective view of the top bar assembly 200. FIGS. 10-13 illustrate various views of mount 250 for the top bar 200.

Figure 14:
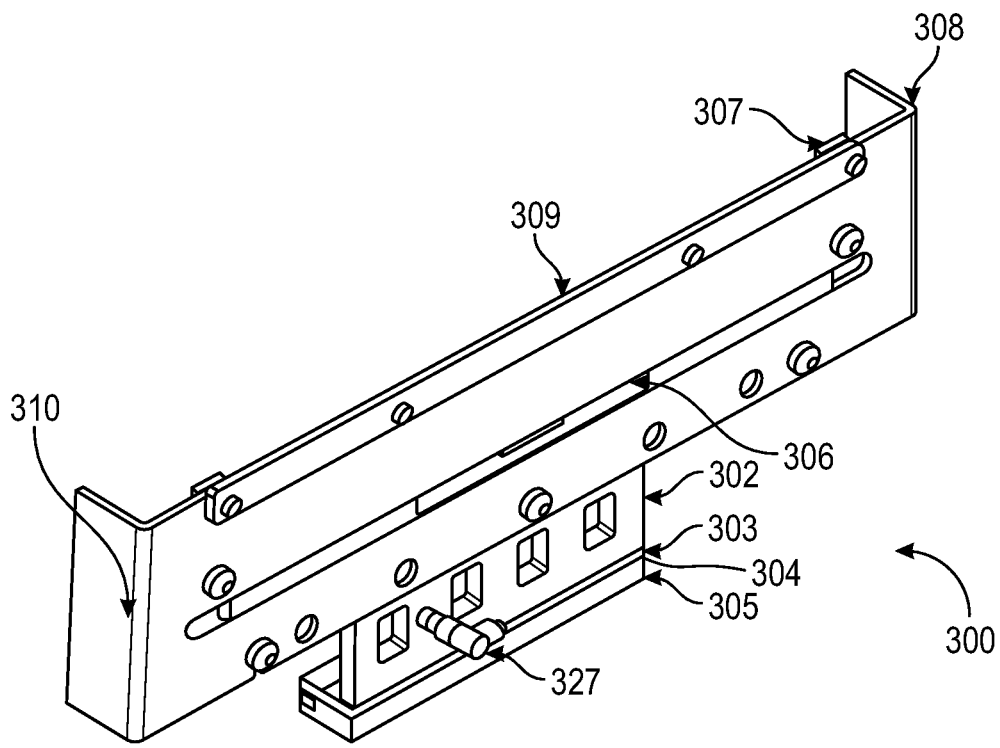
FIG. 14 is a perspective view of a bottom bar assembly of the heat-sealing system of FIG. 1.
Figure 15:
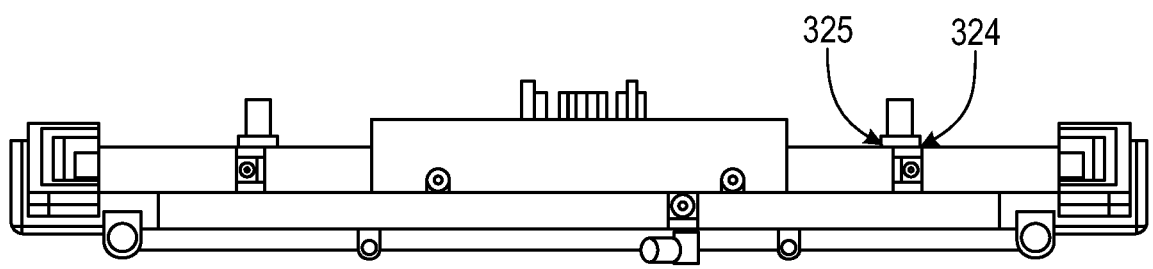
FIG. 15 is a top view of the bottom bar assembly of FIG. 14.
Figure 16:
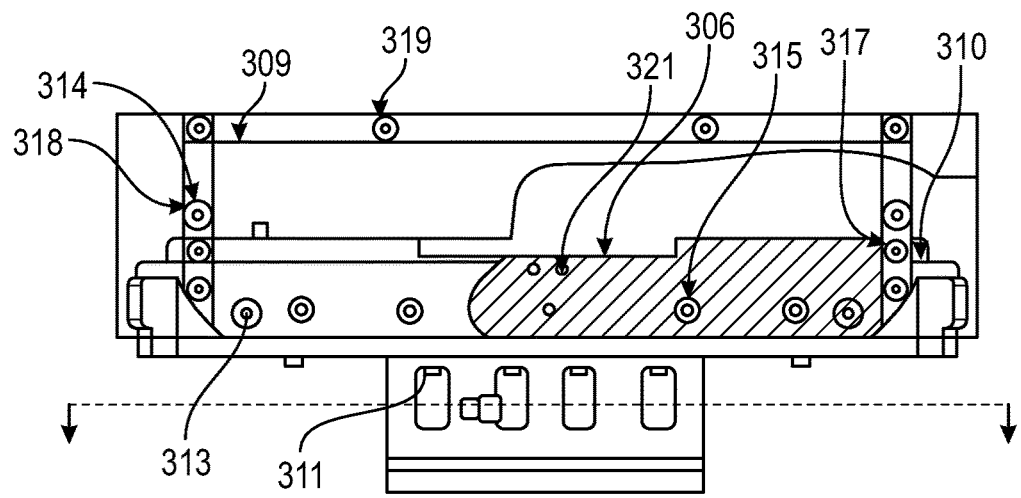
FIG. 16 is a front view of the bottom bar assembly of FIG. 14.
Figure 17:
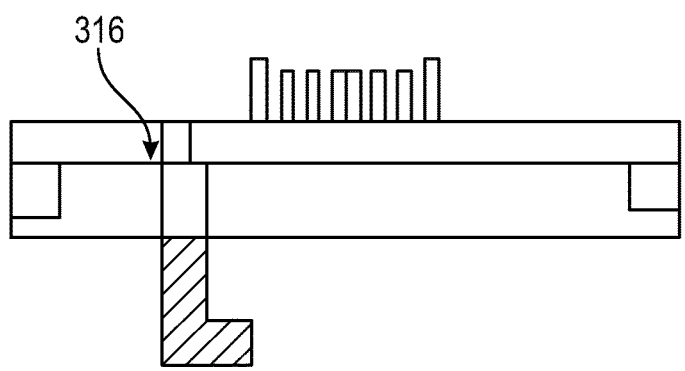
FIG. 17 is a cross-sectional view of the bottom bar assembly of FIG. 16 taken along line B-B.
Figure 18:
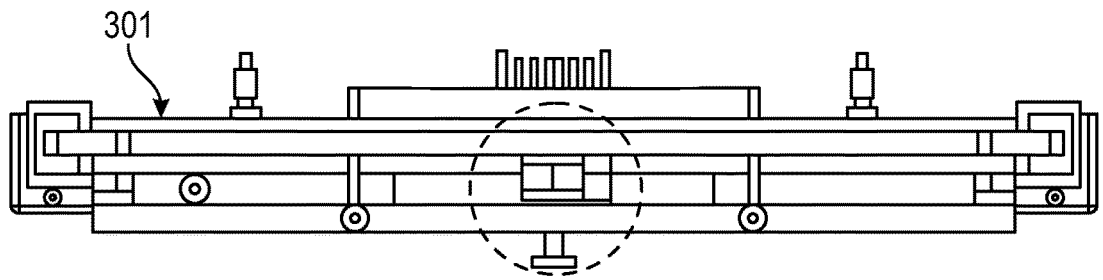
FIG. 18 is another top view of the bottom bar assembly of FIG. 14.
Figure 19:
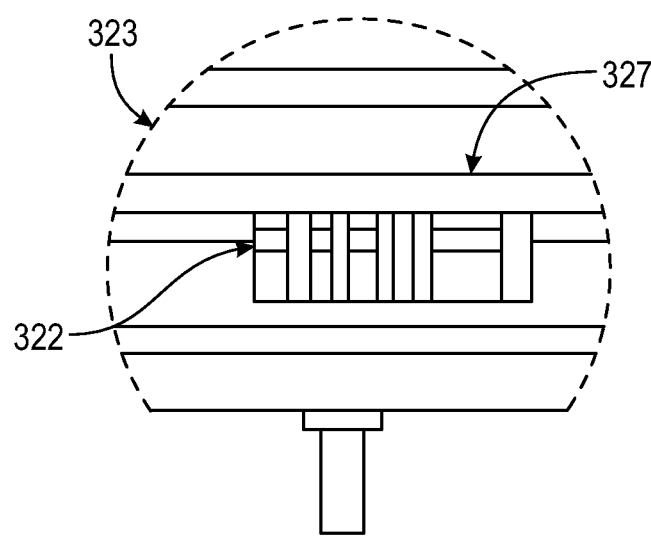
FIG. 19 illustrates enlarged detail A of FIG. 18.
Figure 20:
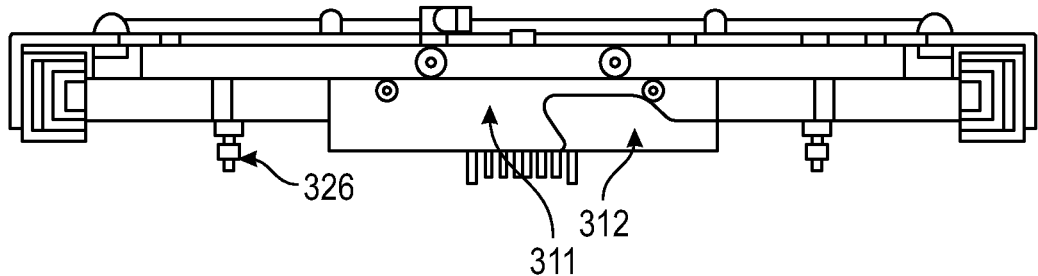
FIG. 20 is a bottom view of the bottom bar assembly of FIG. 14.
Figure 21:
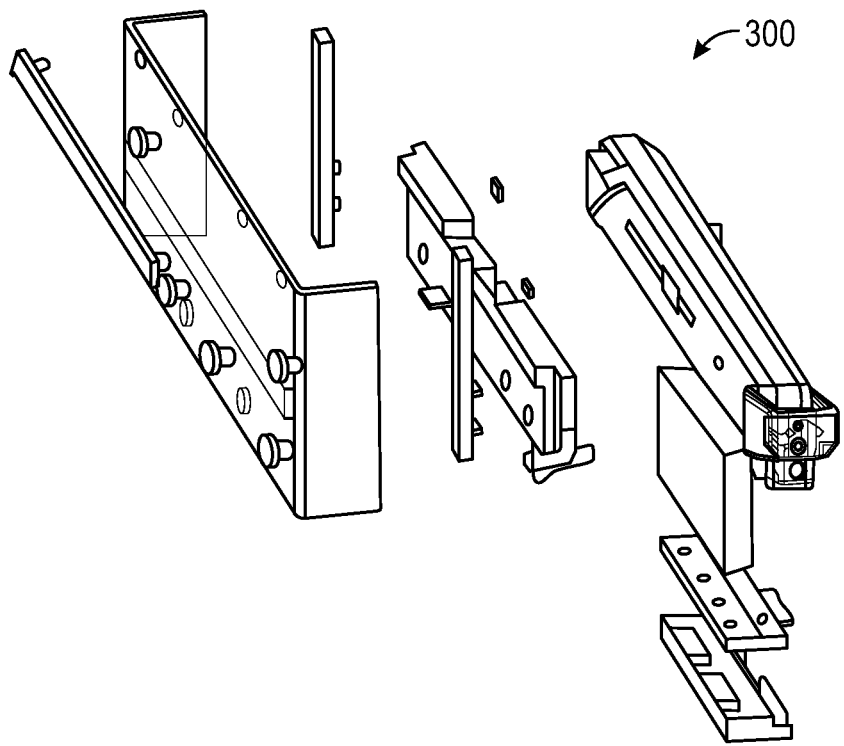
FIG. 21 is a left-side exploded view of the bottom bar assembly of FIG. 14.
Figure 22:
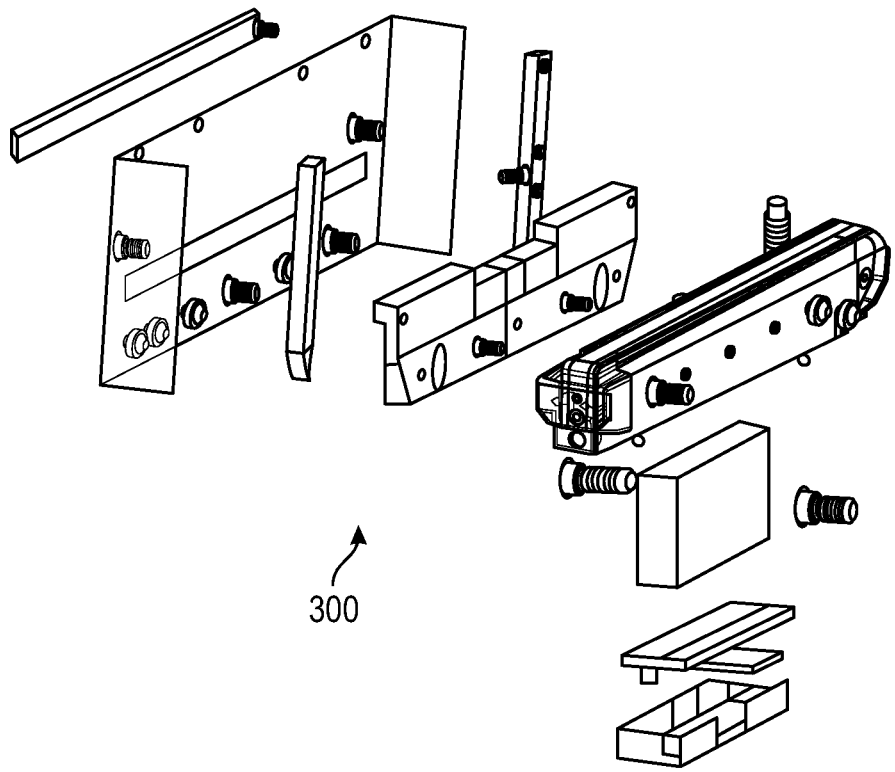
FIG. 22 is a right-side exploded view of the bottom bar assembly of FIG. 14.

Structural components of top bar assembly 200 are set forth below:
- 201—bar assembly, top (no band)
- 202—cover, bar PCB top
- 203—PCB bar assembly
- 204—cover, bar PCB bottom
- 205—cover, to bar
- 206—thread screw
- 207—SHCS
- 208—BHCS, pin in hex
- 209—cable tie mount, screw
- 210—hex drive screw
- 211—shoulder screw
- 212—band, heat steel FIGS. 10-13 illustrate various views of mount 250 for the top bar 200. Structural components of top mount 250 are set forth below:
- 251—mount, top bar
- 252—cover, PCB bottom
- 253—machine PCB assembly, Packworld sealer
- 254—cover, PCB top 255—SHCS
256—bushing
257—screw SHCS
258—screw SHCS FIGS. 14-22 illustrate different views of bottom bar assembly 300 of the heat-sealing system 1000 of the present disclosure. FIG. 14 depicts a perspective view of the bottom bar assembly 300. FIG. 15 is a top view and FIG. 16 is a front view of the bottom bar assembly 300. FIG. 17 illustrates a cross-sectional view of the bottom bar assembly 300 taken along line B-B of FIG. 16. FIG. 18 shows a top view of the bottom bar assembly 300, and FIG. 19 illustrates enlarged detail A of FIG. 18. FIG. 20 is a bottom view of the bottom bar assembly 300. FIGS. 21 and 22 are left-side and right-side exploded views of the bottom bar assembly 300.

Structural components of bottom bar assembly 300 are set forth below:
- 301—bar assembly, bottom (no band)
- 302—bar, PCB mounting, bottom
- 303—cover, bar PCB bottom
- 304—PCB bar assembly
- 305—cover, bar PCB top
- 306—guide, sealing
- 307—bar, vertical support, cover
- 308—cover, protective jaws
- 309—bar, cover stiffener PCB bottom
- 310—heat seal band
- 311—screw SHCS
- 312—SHCS
- 313—BHCS
- 314—washer, oversized flat
- 315—BHCS, pin in hex
- 316—connector pin, bulkhead
- 317—FHCS
- 318—BHCS, pin in hex
- 319—BHCS, pin in hex
- 321—screw
- 322—washer
- 323—nut
- 324—cable tie mount
- 325—button head hex drive screw
- 326—shoulder screw
- 327—sensor assembly, pouch present Reference is now made to FIGS. 23-28 which show additional views of the top and bottom bar assembly 201, 301 of the present disclosure.

Figure 23:
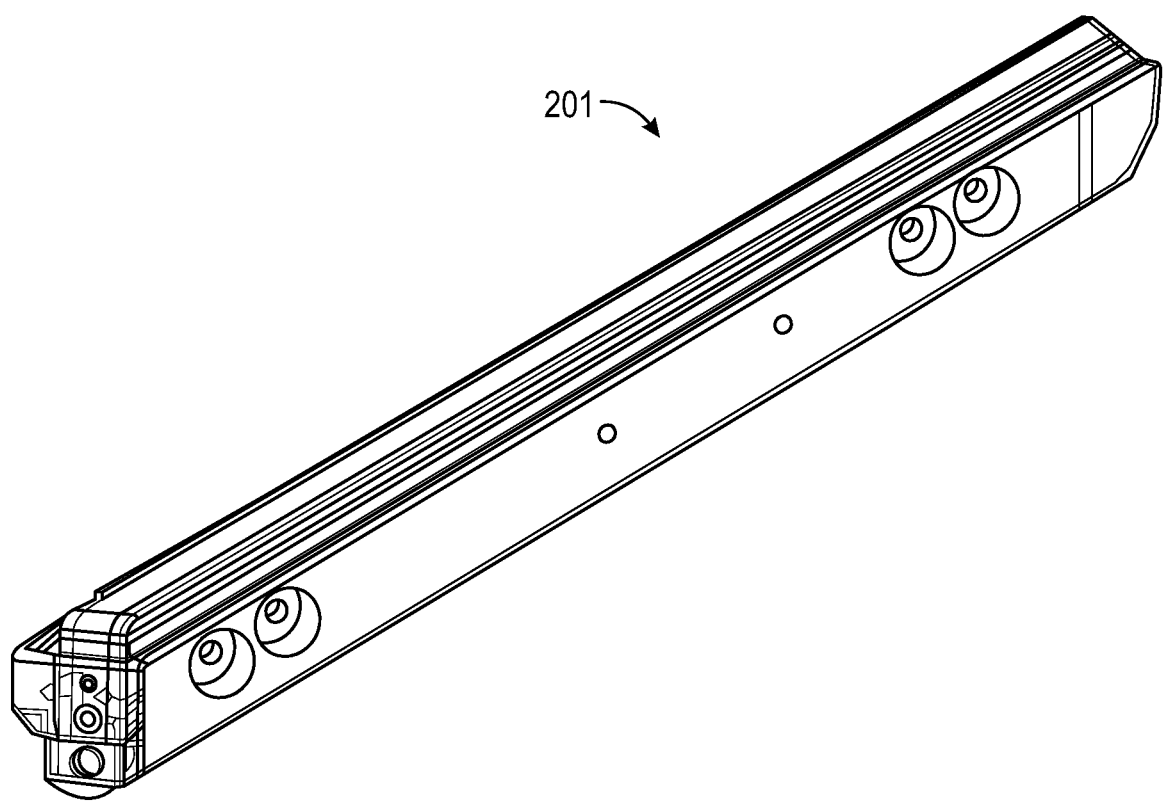
FIG. 23 is a perspective view of a top bar assembly (with no band).
Figure 26:
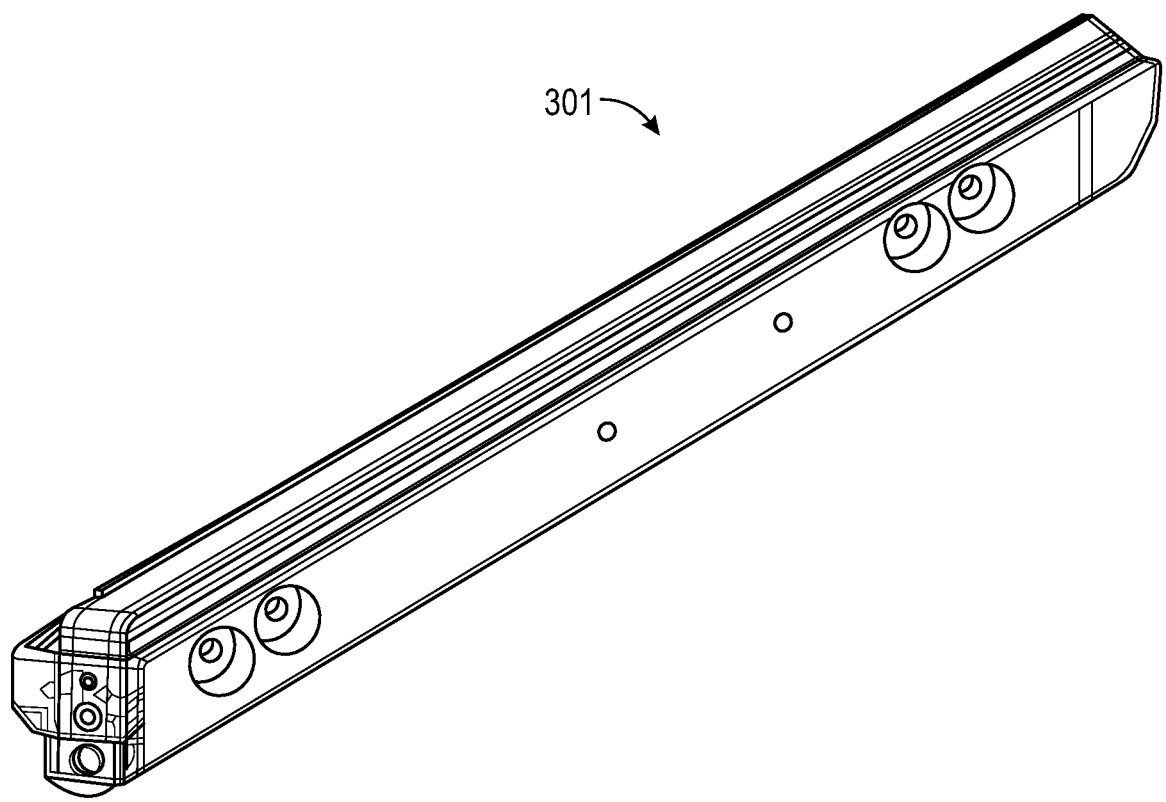
FIG. 26 is a perspective view of a bottom bar assembly (with no band).
Figure 27:
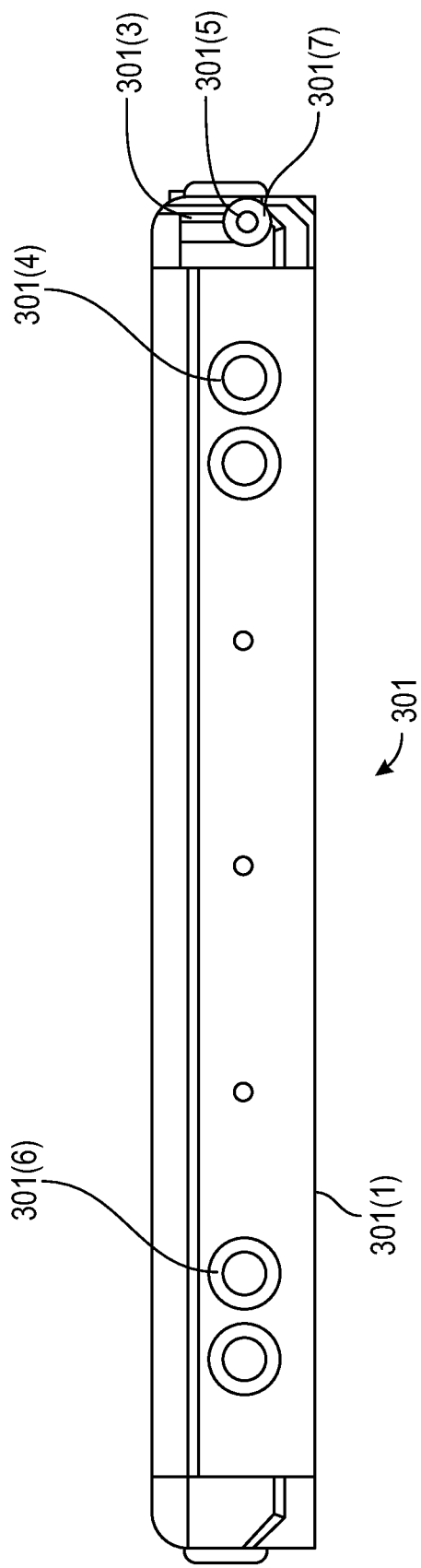
FIG. 27 is a front view of the bottom bar assembly of FIG. 23.
Figure 28:
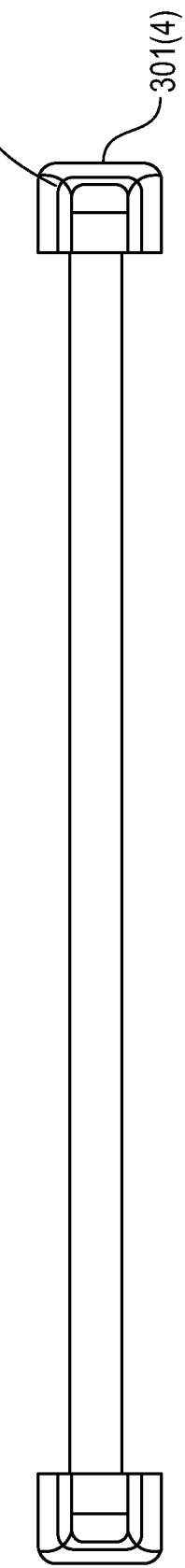
FIG. 28 is a top view of the bottom bar assembly of FIG. 23.
Figure 29:
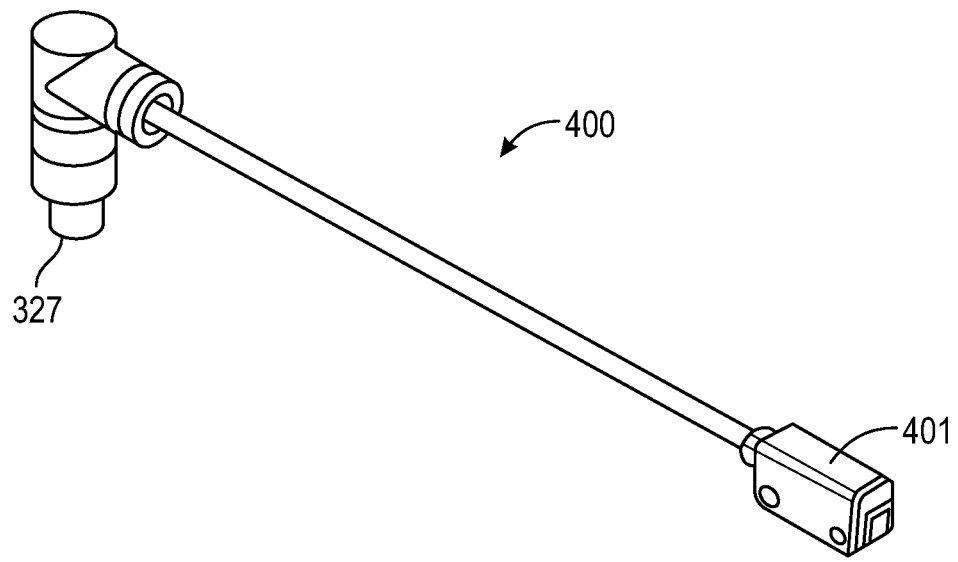
FIG. 29 is a perspective view of a sensor assembly.
Figure 30:
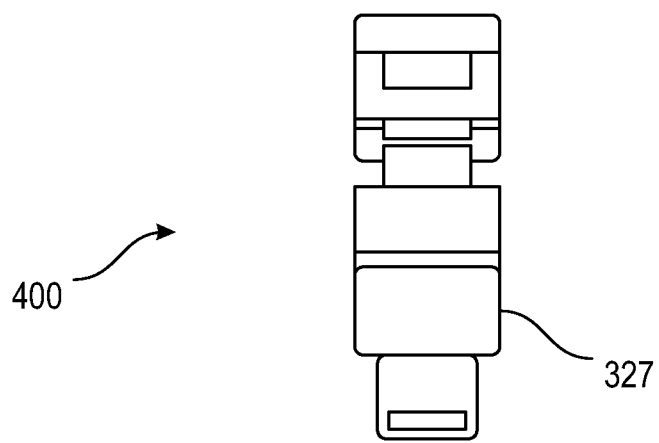
FIG. 30 is a left side view of the sensor assembly of FIG. 29.
Figure 31:
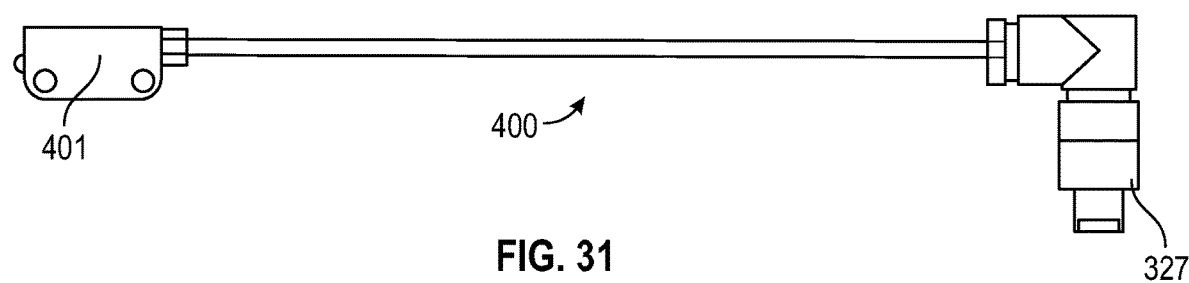
FIG. 31 is a front view of the sensor assembly of FIG. 29 (rotated 180 degrees).
Figure 32:
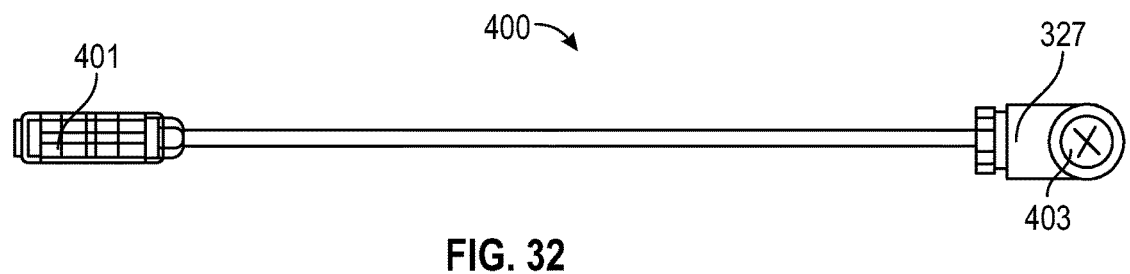
FIG. 32 is a top view of the sensor assembly of FIG. 31.
Figure 33:
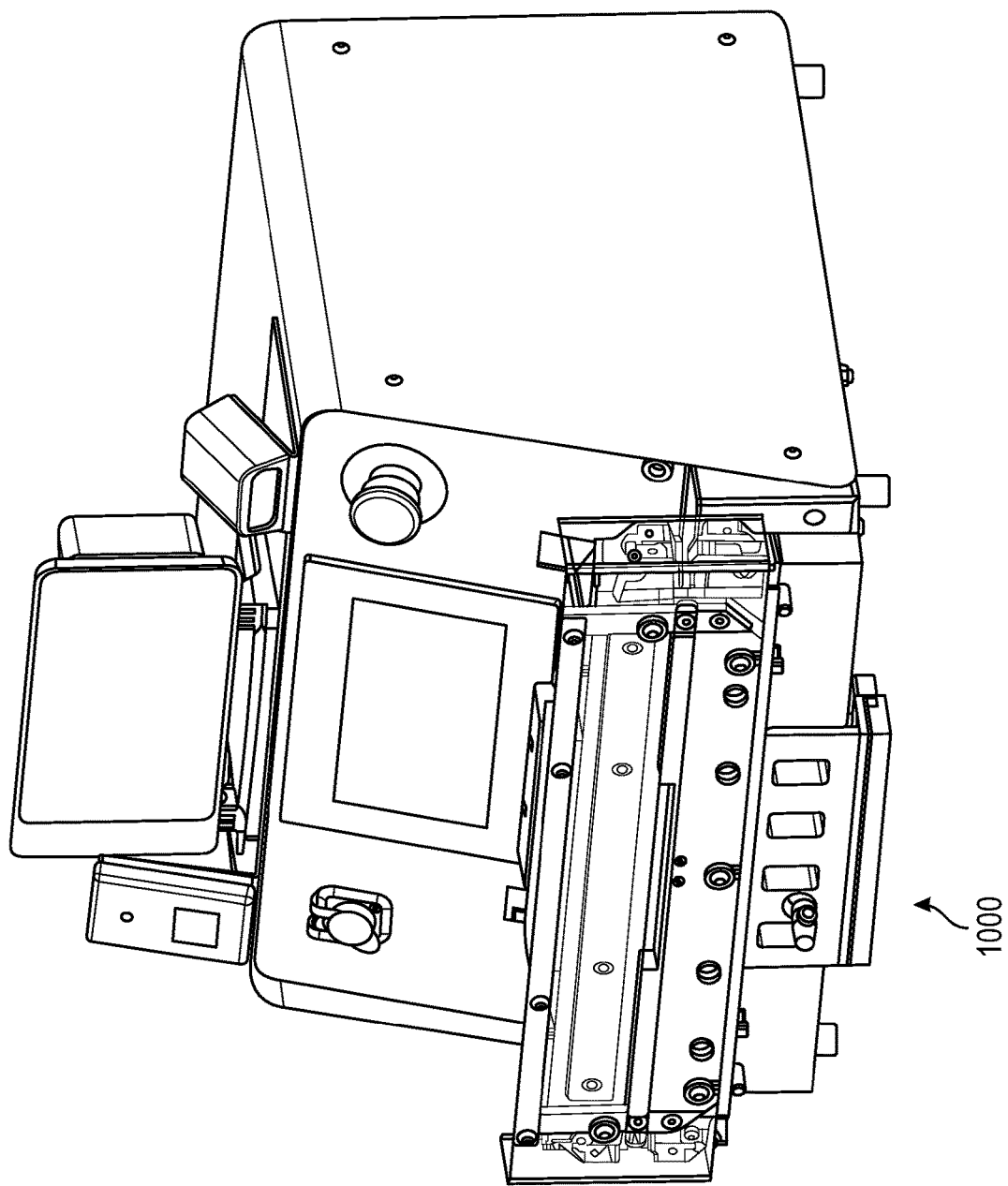
FIG. 33 is another perspective view of the heat-sealing system of FIG. 1.
Figure 34:
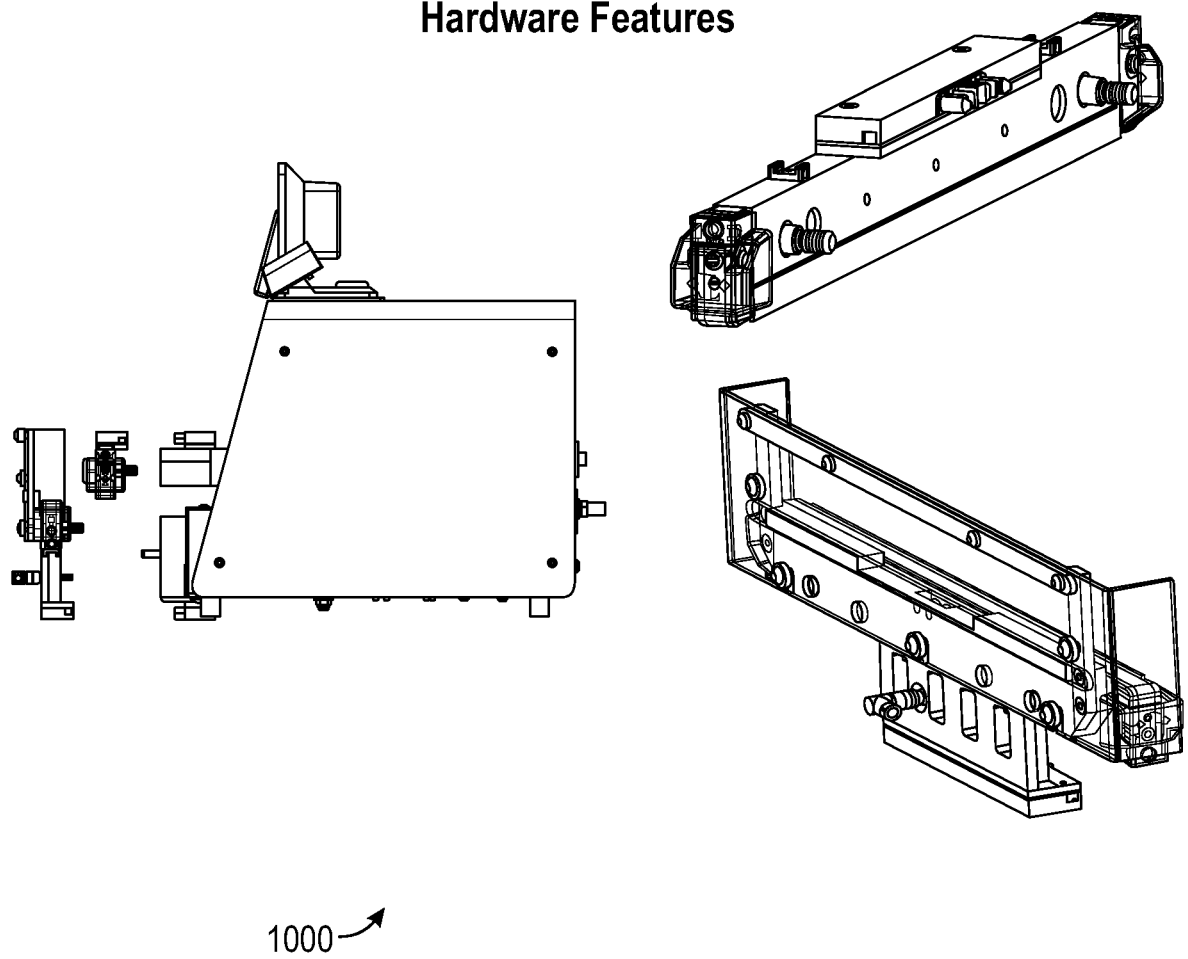
FIG. 34 illustrates various hardware components of the heat-sealing system of FIG. 33.

Structural components of top bar assembly 201 of FIGS. 23-25 are set forth below:
- 201(1)—bar heating
- 201(2)—top, bar end
- 201(3)—cover, bar end
- 201(4)—bushing
- 201(5)—screws
- 201(6)—base, bar end
- 201(7)—clip, bar end Structural components of bottom bar assembly 301 of FIGS. 26-28 are set forth below:
- 301(1)—bar heating
- 301(2)—base, bar end
- 301(3)—top, bar end
- 301(4)—cover, bar end
- 301(5)—clip, bar end
- 301(6)—bushing
- 301(7)—screws FIGS. 29-32 illustrate various views of sensor assembly 400. FIG. 29 shows sensor assembly 400 in a perspective view. FIG. 30 is a left side view of the sensor assembly 400, and FIG. 31 is a front view of the sensor assembly 400 (rotated 180 degrees). FIG. 32 is a top view of the sensor assembly 400.

Structural components of bottom sensor assembly 400 of FIGS. 29-32 are set forth below:
- 327—sensor
- 401—banner
- 403—connector orientation The removable heat bars detailed above (first and second bars; top and bottom bars; upper and lower bars) have the following features:
- Integrated connector to eliminate electrical connections
- A thermocouple for each sealer (put in a carrier and stored on the unit until needed for calibration)
- Shield/Guide mounted to lower bar to ensure effective heating area is used
- Integrated memory chip
- Identify bar type
- Record cycles for PM schedule
- Record calibration data for installed band
- Integrated shield to protect operator and guide pouch into effective heat location
- Bars can be built off-line as PM requires
- Selection of bars stored in a tool storage for use as needed The hardware and software assembly on each sealer provides the following benefits:
- Provide operator interface
- Scan operator badge
- Scan Work Order/Operation
- Retrieve and set recipe per work order
- Read/Write onboard memory chip
- Write removable bar calibration data to controller
- Verify correct bar for work order
- Update number of seals per bar
- Display/Print/Record
- Setup parameters
- Max/Min temperature and pressure for batch or each pouch Hardware—Custom Designed Bars
- Quick change out due to high-mix low-volume environment
- Integrated electrical connection
- Ensure bar parallelism
- Integrated shield
- Integrated pouch detection Software—Processing and Display Unit/Monitor
- Enforce use of correct custom band
- Set sealer parameters based on pouch
- Prevent sealing of unvalidated pouches
- Monitor bar cycles for PM schedule
- Require sealer calibration to be within acceptable limits
- Allow operator to fail pouch based on visual criteria and record rationale A Packworld PW3400 Dual Heat Sealer with Process Monitor can include replaceable bars; RFID scanner for employees badge; process monitor; scanner for work order and pouch number; and heat sealer (PW 3400).

Hardware features can include top mount; top bar; bottom bar; bottom mount; limit pouch opening and presence sensor; safety shield; electrical power connector and integrated memory chip on top bar (bars are built off-line and staged for quick change).

Software features can include:
- Modbus communication with sealer PLC (all communication and control of the sealer from the process monitor is performed through the Modbus)
- Enable/Disable sealer Set and monitor key process data
Read/Write bar information on bar memory chip
ID, Type, Category, Build Date, Cycle Count
Calibration
AutoCal and 8 Point forced after bar change
Temperature verified after calibration, require repeating as needed
Other features
Pouch part number based parameter settings including validated ranges and bar type
Record sealing history—Max, Min, Avg Temp/Pres
Record operator failure to track reason for scrap The present disclosure overcomes drawbacks of impulse pouch sealers known in the art, particularly when pouches are sealed repeatedly in the same area of the heat bar. During the sealing process, the pouch absorbs the heat from the heat bar causing that section of the bar to be cooler for the next seal unless a delay is introduced to allow the heat bar to return to a uniform temperature. The result can be a poor seal if the cool section is repeatedly used or a burnt seal if the other section is used.

Some prior art sealers use a preset current through the bar to produce the heat. Others, like the Packworld sealer, measure the resistance across the heat band yielding an average temperature. Efforts have been made to delay and allow the heat band to reach equilibrium, randomly or systematically seal over the entire heat band, or use scrap material to absorb the heat from the entire bar. These efforts, however, are undesirable or impractical for a high mix (various pouch widths) and/or low volume production.

The present disclosure overcomes the disadvantages set forth above by matching the heat bar size to the pouch size, thus minimizing the undesirable effects of "cold spots" created along the band when only a portion of the heated region of the heat sealer is utilized repeatedly. The disclosure provides apparatus and methods to create a quality seal, wherein the width of the material being sealed closely matches the effective heating length of a band being heated. The disclosure also provides systems, assemblies, apparatus and devices to easily change out bands and ensure that the effective length of the band matches the width of the seal to provide consistent seal quality. The changing of the bars quick is made possible by providing captive hardware, integrated electrical connections, and precise mounting to keep the bars parallel.

The disclosure also provides methods and apparatus to ensure that correct bars are being used as well as the calibration of the bars, which changes for bars with different effective heating area or even the same bar size which has been in service longer. The replaceable bars have a memory chip installed so each bar can be identified as well as store information concerning the size, age, and number of cycles it has experienced. Hardware and software features are used to enforce all these requirements and adds some additional features.

The disclosure provides:
a means to quickly change heat bars with various effective heat lengths to match pouch size;
a means to store and retrieve information about the heat bars including unique ID, effective heat length, number of cycles and build date;
a means to identify the part number being sealed and ensure the correct bars are installed;
a means to store, retrieve, and set key sealing parameters based on pouch being sealed;
a means to control access to operating the sealer until parameters have been set up properly;
a means to ensure that the sealer has been properly "calibrated" to account for changes in bars;
a means to record the sealing parameters, operator and time associated with each seal; and
top and bottom bar assemblies, circuit boards and work instructions.

Benefits of the disclosure are as follows:
no specific process sequence is required for seal pouches at various areas of the effective length to be effective;
easy to implement and manage multiple pouches at the same time utilizing majority of effective length;
eliminates the need of waste material for unused portions of the effective length;
allows for sealer to be used repeatedly on diverse product line (eliminating order custom heat seal bands with effective length matched to pouch width);
eliminates the use of a thermocouple in the sealing area to monitor localized temperature (eliminates time constant of thermocouples which is too great to maintain temperature during short seal times); and
allows to quickly change bars with different custom heat seal bands.

What is claimed is:

1. A heat-sealing assembly, comprising:
a heat-sealing apparatus;
a plurality of heat bars mounted onto the heat-sealing apparatus and configured to be removably attached to and detached from the heat-sealing apparatus and to be used interchangeably to match and accommodate different sizes of pouches being sealed, wherein each of the plurality of the heat bars has a mount to allow attachment and detachment from the heat-sealing apparatus and to keep the plurality of heat bars parallel, and wherein each of the plurality of the heat bars is a replaceable heat bar and has at least one integrated memory chip to allow bar identification and for storing and retrieving heat bar information regarding size and age of the replaceable heat bar and number of cycles experienced by the replaceable heat bar, and wherein each of the plurality of heat bars is selected to match at least one of length, identification number, or label number of one of the pouches being sealed, and wherein the plurality of heat bars is adapted to match the size of the one of the pouches being sealed; and
a monitoring system integrated with the heat-sealing apparatus,
wherein the monitoring system includes a processing unit configured to verify calibration of the plurality of heat bars, and wherein the plurality of heat bars is used interchangeably and adapted to retrofit the heat-sealing apparatus.

2. The heat-sealing assembly of claim 1, wherein at least one of the plurality of heat bars has dimensions different from dimensions of others of the plurality of heat bars.

3. The heat-sealing assembly of claim 1, wherein a first heat bar and a second heat bar are selected based on identifying criteria of each pouch to be sealed.

4. The heat-sealing assembly of claim 3, wherein the identifying criteria is one of length of the pouch, pouch number, work order, or user ID.

5. The heat-sealing assembly of claim 3, wherein the first heat bar and the second heat bar are replaceable.

6. The heat-sealing assembly of claim 1, wherein the plurality of heat bars have different lengths and widths.

7. The heat-sealing assembly of claim 1, wherein the processing unit is configured to identify data and display the data on a display.

* * * * *